United States Patent
Koyama

(10) Patent No.: US 9,921,556 B2
(45) Date of Patent: Mar. 20, 2018

(54) MACHINE CONTROLLER AND POWER CONSUMPTION CONTROL OF MACHINE TOOL PERIPHERALS

(71) Applicant: FANUC Corporation, Minamitsuru-gun, Yamanashi (JP)

(72) Inventor: Yasuaki Koyama, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 366 days.

(21) Appl. No.: 14/320,858

(22) Filed: Jul. 1, 2014

(65) Prior Publication Data
US 2015/0012119 A1    Jan. 8, 2015

(30) Foreign Application Priority Data
Jul. 3, 2013 (JP) ................. 2013-139447

(51) Int. Cl.
*G05B 15/02* (2006.01)
*G05B 19/418* (2006.01)

(52) U.S. Cl.
CPC ....... *G05B 15/02* (2013.01); *G05B 19/41865* (2013.01); *G05B 2219/32021* (2013.01); *Y02P 70/161* (2015.11); *Y02P 90/20* (2015.11); *Y02P 90/205* (2015.11)

(58) Field of Classification Search
USPC .............................. 700/19; 307/35
See application file for complete search history.

(56) References Cited

U.S. PATENT DOCUMENTS

| | | | |
|---|---|---|---|
| 5,801,961 A * | 9/1998 | Moore | H01L 21/67276 307/19 |
| 2003/0055522 A1 | 3/2003 | Mukuta et al. | |
| 2007/0213864 A1 | 9/2007 | Iijima | |
| 2009/0234511 A1 | 9/2009 | Ouchi et al. | |
| 2010/0264867 A1 | 10/2010 | Iwashita et al. | |
| 2012/0078432 A1 * | 3/2012 | Weatherhead | G06F 1/26 700/295 |
| 2012/0204582 A1 | 8/2012 | Yazaki et al. | |

(Continued)

FOREIGN PATENT DOCUMENTS

| | | |
|---|---|---|
| CN | 101034285 A | 9/2007 |
| CN | 101330557 A | 12/2008 |
| CN | 101479908 A | 7/2009 |

(Continued)

OTHER PUBLICATIONS

Pechmann et al., "Optimizing Energy Costs by Intelligent Production Scheduling" Chapter in Glocalized Solutions for Sustainability in Manufacturing Mar. 7, 2011 pp. 293-298.*

(Continued)

*Primary Examiner* — Emilio J Saavedra
(74) *Attorney, Agent, or Firm* — Drinker Biddle & Reath LLP

(57) ABSTRACT

A machine controller intercommunicates with, and issues machining program commands to, a plurality of peripherals. The controller receives work status information on the peripherals, calculates the total power consumption by the plurality of peripherals based on the received information, and decides the work start timing for the peripherals such that the total does not reach a preset upper limit.

3 Claims, 4 Drawing Sheets

(56) References Cited

U.S. PATENT DOCUMENTS

| | | |
|---|---|---|
| 2013/0013946 A1 | 1/2013 | Hamada |
| 2013/0331959 A1 | 12/2013 | Kawai |

FOREIGN PATENT DOCUMENTS

| | | |
|---|---|---|
| CN | 102472541 A | 5/2012 |
| CN | 102868844 A | 1/2013 |
| DE | 19817191 A1 | 10/1999 |
| DE | 102008045427 A1 | 3/2010 |
| DE | 102009049845 A1 | 4/2011 |
| DE | 102010033633 A1 | 2/2012 |
| EP | 0913905 A2 | 5/1999 |
| JP | 2003-100576 A | 4/2003 |
| JP | 2007-293532 A | 11/2007 |
| JP | 2010-140302 A | 6/2010 |
| JP | 2010-145169 A | 7/2010 |
| JP | 2010-176503 A | 8/2010 |
| JP | 2010-250697 A | 11/2010 |
| JP | 2011-121283 A | 6/2011 |
| JP | 2011-156598 A | 8/2011 |
| JP | 2012-194607 A | 10/2012 |
| JP | 2012-194657 A | 10/2012 |

OTHER PUBLICATIONS

Office Action dated Mar. 8, 2016 in German Patent Application No. 10 2014 009 492.8 (5 pages) with an English Translation (5 pages)
Decision to Grant a Patent dated Feb. 24, 2015 in corresponding Japanese Patent Application No. 2013-139447 with English translation.
Notification of Reasons is for Refusal dated Nov. 11, 2014 in corresponding Japanese Patent Application No. 2013-139447 with English translation.
Office Action dated Jan. 8, 2016 in Chinese Patent Application No. 201410312454.2 (6 pages) with an English Translation (10 pages).

\* cited by examiner

FIG.7

```
%
O0001
(MACHINING START)
G80G40G49
M6T1
G90G00X-84.7Y82.4G43Z3.0
M3S4000
WORK START COMMAND RANGE STARTING POINT FOR
FIRST PERIPHERAL
...
(MACHINING IN PROGRESS)
...
WORK START COMMAND RANGE ENDING POINT FOR
FIRST PERIPHERAL
WORK START COMMAND RANGE STARTING POINT FOR
SECOND PERIPHERAL
...
(MACHINING IN PROGRESS)
...
WORK START COMMAND RANGE ENDING POINT FOR
SECOND PERIPHERAL
M99
%
```

MACHINE CONTROLLER AND POWER CONSUMPTION CONTROL OF MACHINE TOOL PERIPHERALS

RELATED APPLICATION DATA

This application claims priority under 35 U.S.C. § 119 and/or § 365 to Japanese Application No. 2013-139447 filed Jul. 3, 2013, the entire contents is incorporated herein by reference.

BACKGROUND OF THE INVENTION

1. Field of the Invention

The present invention relates to a machine controller and more specifically to a machine controller that intercommunicates with and issues machining program commands to a plurality of peripherals.

2. Description of the Related Art

First, in this specification, "peripherals" include robots that conduct work such as a workpiece change, carriers that carry workpieces, tool changers, and the like, which operate at timing different from that of machining by a machine tool. "Work" refers to a sequence of operations performed by these peripherals for the machine tool for predetermined purposes.

A plurality of motors are attached to a machine tool and a peripheral, and these motors consume large amounts of power during operations such as positioning and axial movement. In a facility such as a factory in which a plurality of machine tools and peripherals are installed, if these motors operate at the same timing, the maximum power consumption in the entire facility may become larger, causing an overload on the power supply equipment in the facility. As a result, the maximum power consumption may exceed the power capacity of the power receiving equipment or private electric generator installed in the facility. If the maximum power consumption exceeds the power capacity, the voltage in the facility may drop, posing an obstacle to the operation of the facility.

To avoid such situations as a voltage drop in the facility, possible methods include the installation of power receiving equipment having a huge power capacity; however, when such power receiving equipment is used, a higher basic contract rate must be paid to an electric power company.

To address power consumption problems without installing power receiving equipment having a large power capacity, there is a need to control operations of industrial machines so that the maximum power consumption in the entire facility is reduced. Some examples of prior art techniques for responding to this need will be given below.

Japanese Patent Application Laid-Open No. 2010-176503 discloses a technique by which, when a machine tool machines a workpiece, the numerical controller for the machine tool transmits a pause command to a robot (peripheral), and the robot that receives the pause command pauses, thereby reducing the robot power consumption. This technique deals with only an issue of reduction in power consumption in a connection between a single machine tool and a robot in the vicinity of the machine tool, and does not aim to reduce power consumption in the whole of a facility in which a plurality of peripherals are placed around a machine tool.

Japanese Patent Application Laid-Open No. 2011-156598 discloses a technique by which, if the power consumption by a machine tool continues to exceed a prescribed value for a predetermined period of time, the controller for the machine tool decreases the feedrate for feed movement or the acceleration/deceleration for spindle rotation movement, thereby reducing the maximum power consumption. This technique controls the machine tool speed to reduce the power consumption. Therefore, productivity may be lowered due to prolonged machining time, or machining conditions may be changed due to a change in the feedrate or spindle rotation speed.

Japanese Patent Application Laid-Open No. 2011-121283 discloses a technique by which a plurality of injection molding machines are connected to a network, and the injection process schedule for a local machine is decided based on the injection process schedule for other machines in injection molding scheduling such that the maximum allowable power is not exceeded, thereby reducing the maximum power consumption. However, this technique controls the process schedules for injection molding machines to reduce the power consumption. Therefore, depending on the controlled process schedules, productivity may be lowered due to prolonged machining time.

SUMMARY OF THE INVENTION

An object of the present invention is accordingly to provide a machine controller by which, in a facility in which a plurality of machine tools and peripherals are installed, the maximum power consumption in the facility is reduced without lowering productivity.

A machine controller according to the present invention intercommunicates with and issues machining program commands to a plurality of peripherals. The machine controller includes a work status receiving section that receives work status information on the peripherals and a work start timing determination section that determines work start timing for the peripherals. The work start timing determination section calculates the total power consumption by the plurality of peripherals based on work status information on the peripherals received by the work status receiving section, and decides the work start timing for the peripherals such that the total does not reach a preset upper limit.

When the total power consumption by a working peripheral and a peripheral to which a work start command is to be issued reaches the upper limit, the work start timing determination section may delay and decide the timing of the work start command for the peripheral to which the work start command is to be issued. The work start timing determination section may determine the peripheral power consumption depending on the number of peripherals in the process of working.

The work start timing determination section may set, in a machining program, a range in which work start is allowed for each peripheral, and decide work start timing for the peripheral within the set range in which work start is allowed.

The work start timing determination section may have a counter for counting the number of peripherals in the process of working based on work status information received by the work status receiving section and a means for enabling a work start command when the number of peripherals in the process of working counted by the counter is lower than a predetermined upper limit or for disabling a new work start command to a peripheral when the number reaches the upper limit.

According to the present invention, it is possible to provide a machine controller by which, in a facility in which a plurality of machine tools and peripherals are installed, the maximum power consumption in the facility is reduced without lowering productivity.

BRIEF DESCRIPTION OF THE DRAWINGS

The above and other objects and features of the present invention will be apparent from the following description of embodiments with reference to the appended drawings, in which:

FIG. 7 illustrates an example of a machining program in which a limitation is imposed on peripheral work start timing to be delayed.

DETAILED DESCRIPTION OF THE PREFERRED EMBODIMENTS

First Embodiment

In this embodiment, each machine tool is connected to a network, and therefore the controller for each machine tool identifies the work status of peripherals and determines work start timing for these peripherals. Instead of machine tools, industrial machines such as injection molding machines, electric discharge machines, and pressing machines may be used. Each machine tool has a numerical controller provided with a network interface. Each peripheral has a controller provided with a network interface, such as a numerical controller or programmable logic controller (PLC). An intercommunication means is not limited to a network, and a means using input/output signals may be employed.

In addition to providing normal functions for controlling operations of the machine tools, the numerical controllers for the machine tools perform processing for receiving the peripheral work status and deciding the peripheral work start timing. In addition to providing normal functions for controlling operations of the peripherals, the controllers for the peripherals perform processing for transmitting the peripheral work status.

The machine tools monitor the work status of each peripheral at all times or arbitrary timing. The work status that should be monitored includes information indicating whether each peripheral is working or on standby.

A machining program for each machine tool includes a work start command for a peripheral, in addition to a machining command for the machine tool. For example, if a peripheral is a robot, work start commands for the peripheral are typically included at a point before the end of machining by the machine tool and a point immediately after the end of machining, which correspond to an operation of movement to the standby position and a workpiece change operation, respectively. After a machine tool issues a work start command, the peripheral immediately starts working for the machine tool that has issued the command.

Figure 1:
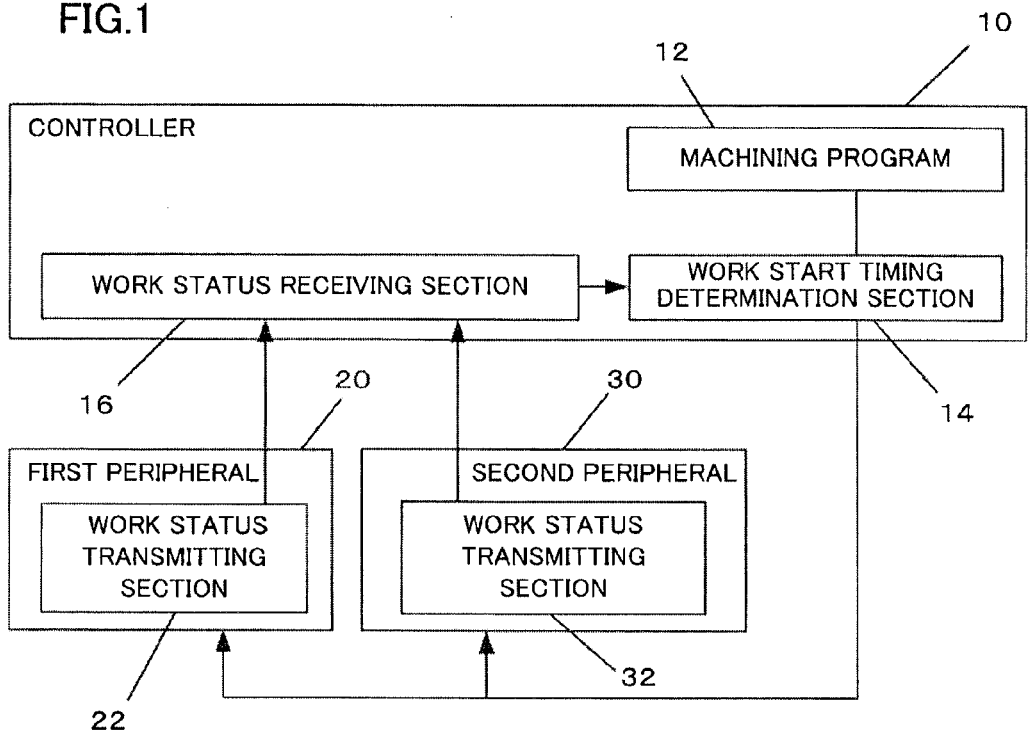
FIG. 1 is a block diagram illustrating a relationship between a first embodiment of a machine controller according to the present invention and peripherals.

FIG. 1 is a block diagram illustrating a relationship between a machine controller in this embodiment and peripherals.

A machine tool controller 10 includes a work start timing determination section 14 and a work status receiving section 16 internally. A machining program 12 is stored in the machine tool controller 10, and is used to issue a machining command to the machine tool and a work start command to a peripheral. The controller 10 stores, in advance, information for the power consumption by the peripherals in table format for each peripheral.

A first peripheral 20 and a second peripheral 30 are provided outside the machine tool controller 10, and are connected with the machine tool controller 10 via a network. The peripherals 20, 30 internally have work status transmitting means 22, 32, respectively, which transmit the work status of the peripherals 20, 30 (specifically, the status of whether the peripherals are working or on standby) to the machine tool controller 10.

The work status receiving section 16 receives the work status transmitted from the work status transmitting means 22, 32 of the peripherals 20, 30, monitors the work status of the peripherals 20, 30, and transmits the received work status to the work start timing determination section 14.

The work start timing determination section 14 decides the work start timing for the peripherals 20, 30 depending on the work status of the peripherals transmitted from the work status receiving section 16, and transmits the work start command to each of the peripherals 20, 30.

Figure 2:
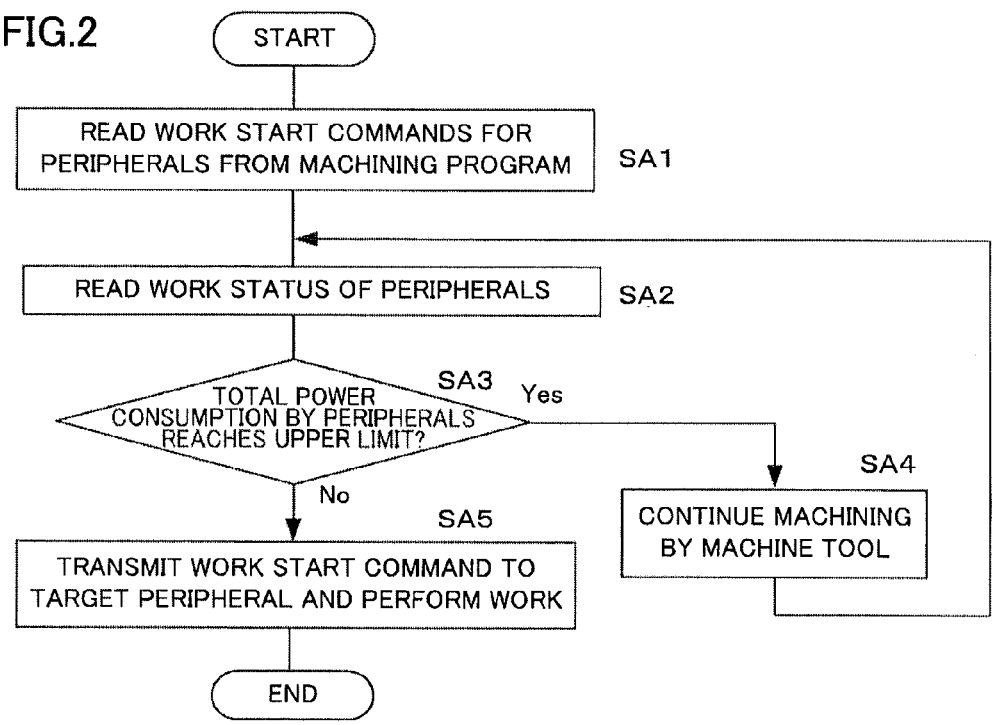
FIG. 2 is a flowchart illustrating a flow of processing performed by the controller shown in FIG. 1 for adjusting peripheral work start timing.

The method for deciding the work start timing for the peripherals 20, 30 will be described with reference to FIG. 2. FIG. 2 is a flowchart illustrating a flow of processing for adjusting the work start timing in this embodiment. Each step will be described below.

(Step SA1) The work start timing determination section 14 in the machine tool controller 10 reads work start commands for the peripherals 20, 30 from the machining program 12.

(Step SA2) The work status of the peripherals 20, 30 is read.

(Step SA3) The total power consumption by a peripheral to which a work start command is to be issued this time and the other peripheral that is currently working is calculated, and a determination is made as to whether or not the calculated value (total power consumption) reaches the upper limit of the power consumption. If the upper limit is reached (YES), the flow proceeds to step SA4; if the upper limit is not yet reached (NO), the flow proceeds to step SA5.

(Step SA4) Machining by the machine tool is continued, and the flow returns to step SA2 and waits until the work by either of the peripheral transmits and thus the total power consumption by the peripherals becomes lower than the upper limit.

(Step SA5) A work start command is transmitted to the peripheral to which the work start command should be issued, and peripheral work is performed.

Figure 3:
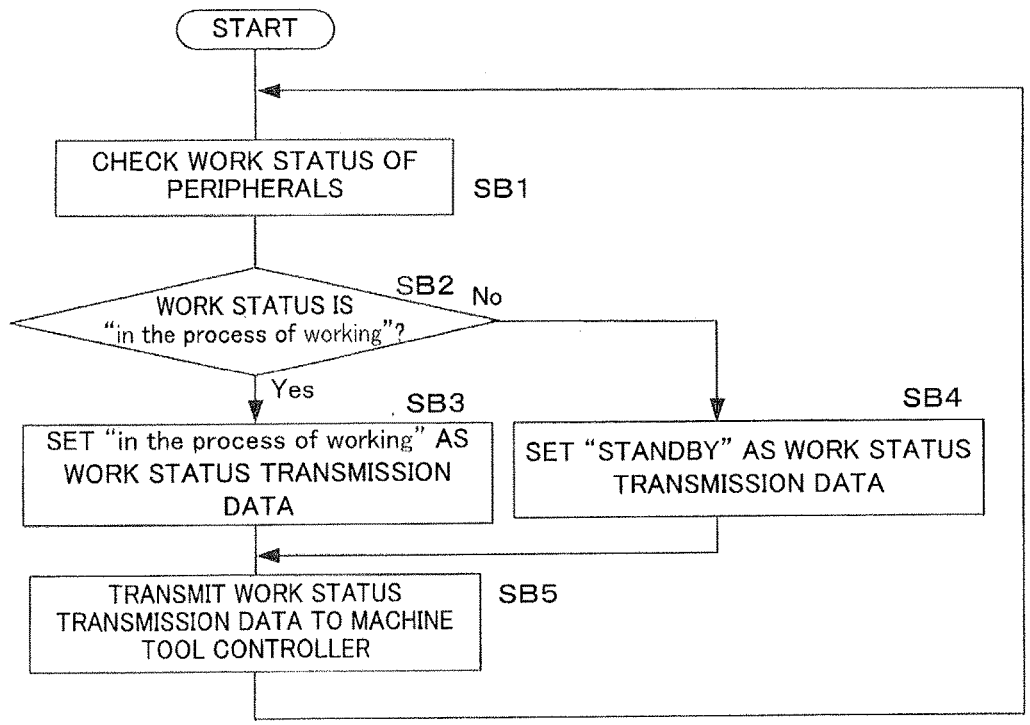
FIG. 3 is a flowchart illustrating a flow of processing by each peripheral for transmitting its work status information to the machine tool controller shown in FIG. 1.

FIG. 3 is a flowchart illustrating a flow of processing by each peripheral for transmitting its work status information to the machine tool controller. Each step will be described below.

(Step SB1) The work status of the peripherals 20, 30 is checked.

(Step SB2) A determination is made as to whether or not the checked work status is "in the process of working". If the work status is "in the process of working" (YES), the flow proceeds to step SB3; if the work status is "standby" rather than "in the process of working" (NO), the flow proceeds to step SB4.

(Step SB3) "in the process of working" is set as work status transmission data, and the flow proceeds to step SB5.

(Step SB4) "Standby" is set as work status transmission data, and the flow proceeds to step SB5.

(Step SB5) The work status transmission data is transmitted to the machine tool controller, and the flow returns to step SB1.

In the transmission processing shown in FIG. 3, the peripherals 20, 30 check the work status at all times and transmit data to the machine tool controller 10. However, the work status may be checked and transmitted to the machine tool controller 10 only when the machine tool controller 10 makes a request to check the work status of the peripherals 20, 30.

Figure 4:
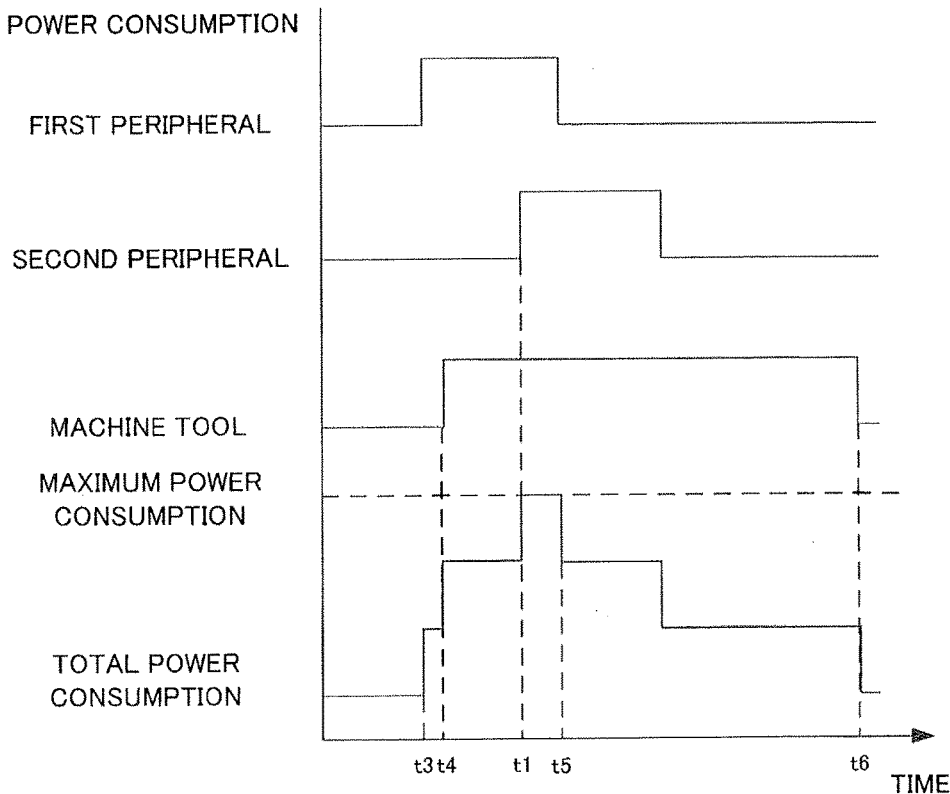
FIG. 4 is a power consumption timing diagram in a prior art technique.

FIG. 4 is a power consumption timing diagram in a prior art technique.

As shown in FIG. 4, the work by the first peripheral 20 starts at a time t3, the work by the machine tool starts at a time t4, and the work by the second peripheral 30 starts at a time t1. The work by the first peripheral 20 ends at a time t5 and the work by the machine tool ends at a time t6. If a work start command for the second peripheral 30 is read at the time t1 to start work, the machine tool, the first peripheral 20, and the second peripheral 30 work simultaneously until the time t5, at which the work by the first peripheral 20 ends. Therefore, the power consumption is large during that period (from the time t1 to the time t5).

Figure 5:
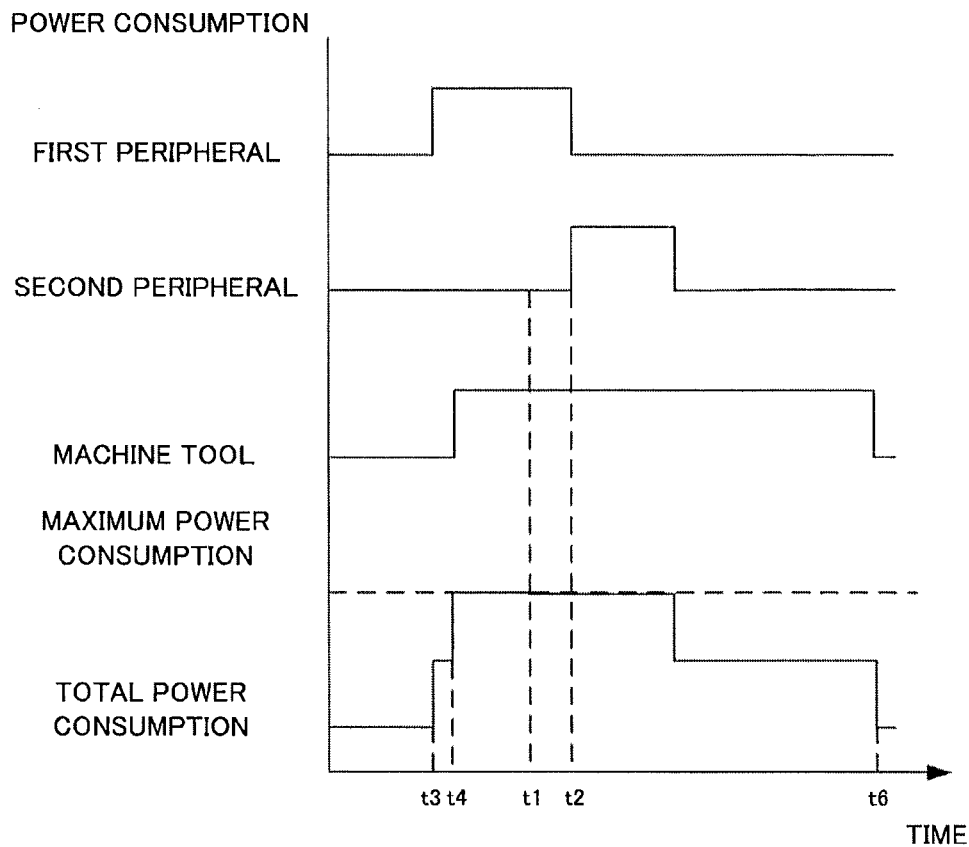
FIG. 5 is a power consumption timing diagram in the first embodiment according to the present invention.

FIG. 5 is a power consumption timing diagram in this embodiment.

In this embodiment, when a work start command is to be transmitted to the second peripheral 30 at the time t1, the total power consumption by the second peripheral 30 to which the work start command is to be transmitted and the first peripheral 20 that is currently working exceeds the predetermined value, and therefore machining by the machine tool is continued without transmitting the work start command to the second peripheral 30, as shown in FIG. 5. At a time t2, at which the work by the first peripheral 20 ends, the work start command is transmitted to the second peripheral 30 to start work by the second peripheral 30. Accordingly, the period during which the first peripheral 20 works and the period during which the second peripheral 30 works do not overlap each other, resulting in the maximum power consumption being smaller, as compared with the prior art technique shown in FIG. 4. In both FIG. 4 (prior art technique example) and FIG. 5 (this embodiment), machining by the machine tool is performed between the time t4 and the time t6. As can be seen from a comparison between FIG. 4 and FIG. 5, however, machining by the machine tool is not affected by a delay in the work start timing for the second peripheral 30. It is thus possible to reduce the maximum power consumption without changing the machining time or machining conditions for the machine tool.

This embodiment can also be applied to a facility in which the numerical controllers for machine tools receive the work status also from peripherals other than those within a machining cell and a plurality of machining cells are provided. It is thus possible not only to reduce the power consumption by the machining cells, but also to reduce the maximum power consumption in the entire facility.

Second Embodiment

In this embodiment, to monitor the maximum peripheral power, the maximum number of peripherals that operate simultaneously is preset based on, for example, the maximum power consumption in a facility and the number of installed peripherals and machine tools. Then, peripheral work start command timing is set such that the number of peripherals that operate simultaneously is smaller than or equal to the maximum number.

Figure 6:
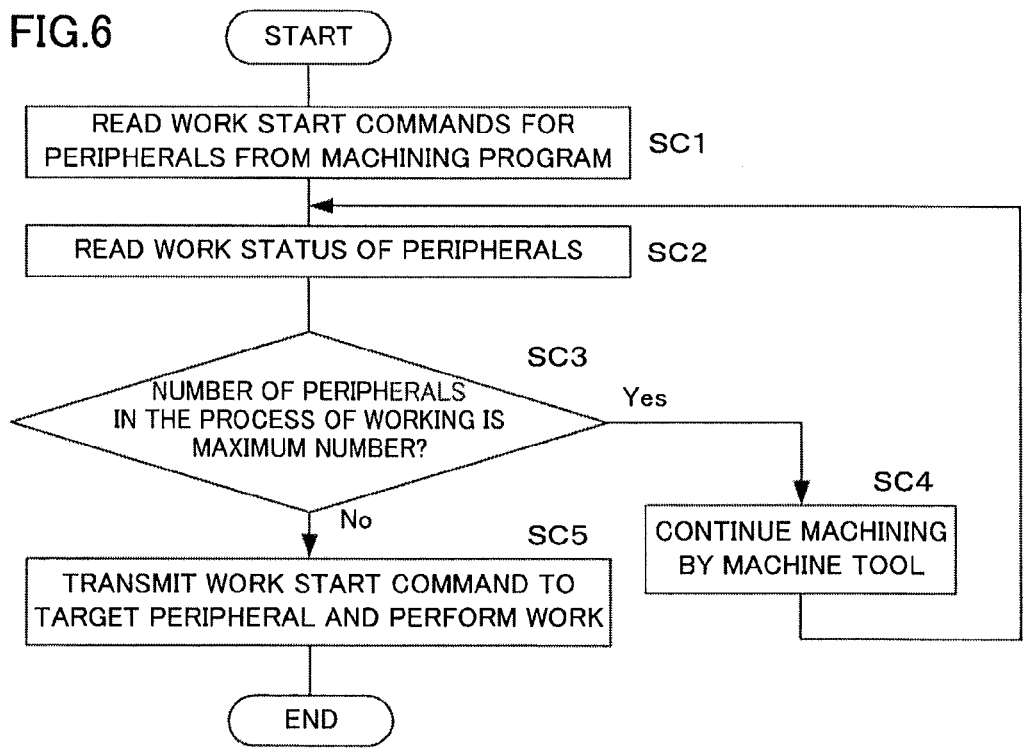
FIG. 6 is a flowchart illustrating a flow of processing performed by a second embodiment of a machine controller according to the present invention for adjusting peripheral work start timing.

FIG. 6 is a flowchart illustrating a flow of processing performed by this embodiment for adjusting peripheral work start timing. Each step will be described below.

(Step SC1) The work start timing determination section 14 in the machine tool controller 10 reads work start commands for the peripherals 20, 30 from the machining program 12.

(Step SC2) The work status of the peripherals 20, 30 is read.

(Step SC3) A determination is made as to whether or not the number of currently working peripherals reaches the predetermined maximum number. If the upper limit is reached (YES), the flow proceeds to step SC4; if the upper limit is not reached (NO), the flow proceeds to step SC5.

(Step SC4) Machining by the machine tool is continued, and the flow returns to step SC2 and waits until the work by either of the peripherals 20, 30 ends.

(Step SC5) A work start command is transmitted to the peripheral to which the work start command should be issued, and peripheral work is performed.

In this embodiment as well, it is possible to reduce the maximum power consumption as in the power consumption timing diagram shown in FIG. 5, in a manner similar to the first embodiment. In the description of this embodiment, the maximum number of peripherals that operate simultaneously is assumed to be large. However, the number of peripherals that operate may be set to 1. In this case, it goes without saying that, if any one of peripherals is operating, a new (another) peripheral operation cannot be started.

Third Embodiment

In the above first and second embodiments, timing of peripheral work start is controlled by monitoring the maximum power consumption and the number of peripherals that operate simultaneously. If a work start command can be delayed without limitation, however, the following may occur: For example, if a peripheral is a robot that changes workpieces, the next machining command is issued before workpieces are changed, as a result, machining of a machined workpiece is erroneously started. For this reason, this embodiment imposes a limitation on peripheral work start timing to be delayed in a machining program.

FIG. 7 illustrates an example of a machining program in this embodiment. For example, when a robot that changes workpieces is used as a first peripheral, a work start command range starting point is set immediately after the workpiece change work in the previous machining and a work start command range ending point is set before the machining completion command in the current machining. A work start command is accepted only from the set range starting point to the set range ending point, and therefore a range in which work start timing is delayed is limited to a range from the range starting point to the range ending point. As a result, it is possible to prevent a work start command from being delayed without limitation. With this method, even in a case where a single peripheral is shared among a plurality of machine tools, by restricting a range in which a work start command is accepted, it is possible to prevent confusion in the order, such as a case where a robot that changes a workpiece is on standby before a first machine tool and then start performing a workpiece change for a second machine tool.

In addition to the work status, the order of machine tools which read work start commands in machining programs is transmitted and received, and the work start commands are executed according to the order. Accordingly, it is possible to perform work in the exact order in which the work start commands are read in the machining programs, and to use work start timing ranges effectively.

The invention claimed is:

1. A machine controller intercommunicating with and issuing machining program commands to a plurality of peripherals and to a machine tool, wherein the plurality of peripherals conduct workpiece handling operations to supplement machining by the machine tool, the machine controller comprising:
   a work status receiving section that receives work status information on the plurality of peripherals, that includes whether a peripheral is working; and
   a work start timing determination section that determines work start timing for the peripherals by reading current work start commands from a machining program for each of the peripherals, storing predetermined power consumption characteristics for each of the plurality of peripherals, and determining a total power consumption at a point in time by the plurality of peripherals based on the predetermined power consumption characteristics, wherein
   the work start timing determination section sets, in the machining program, commands for ranges in which work start is allowed for each peripheral based on the work status information on the peripherals received by the work status receiving section, and decides the determined work start timing for the peripherals within the set range in which work start is allowed, and such that the total power consumption by the plurality of peripherals at the point in time does not reach a preset upper limit, wherein the allowed work start is a limitation on peripheral work start timing so that operation of the machine tool is not affected by the work start timing for the peripherals,
   and
   wherein when total power consumption by a working peripheral and a peripheral to which a work start command is to be issued reaches the upper limit, the work start timing determination section delays and decides the timing of the work start command for the peripheral to which the work start command is to be issued.

2. The machine controller according to claim 1, wherein the work start timing determination section determines peripheral power consumption depending on the number of peripherals in the process of working.

3. The machine controller according to claim 1, wherein the work start timing determination section includes a counter for counting the number of peripherals in the process of working based on work status information received by the work status receiving section and a work start command enabling/disabling section for enabling a work start command when the number of peripherals in the process of working counted by the counter is lower than a predetermined upper limit or for disabling a new work start command to a peripheral when the number reaches the upper limit.

* * * * *